UNITED STATES PATENT OFFICE.

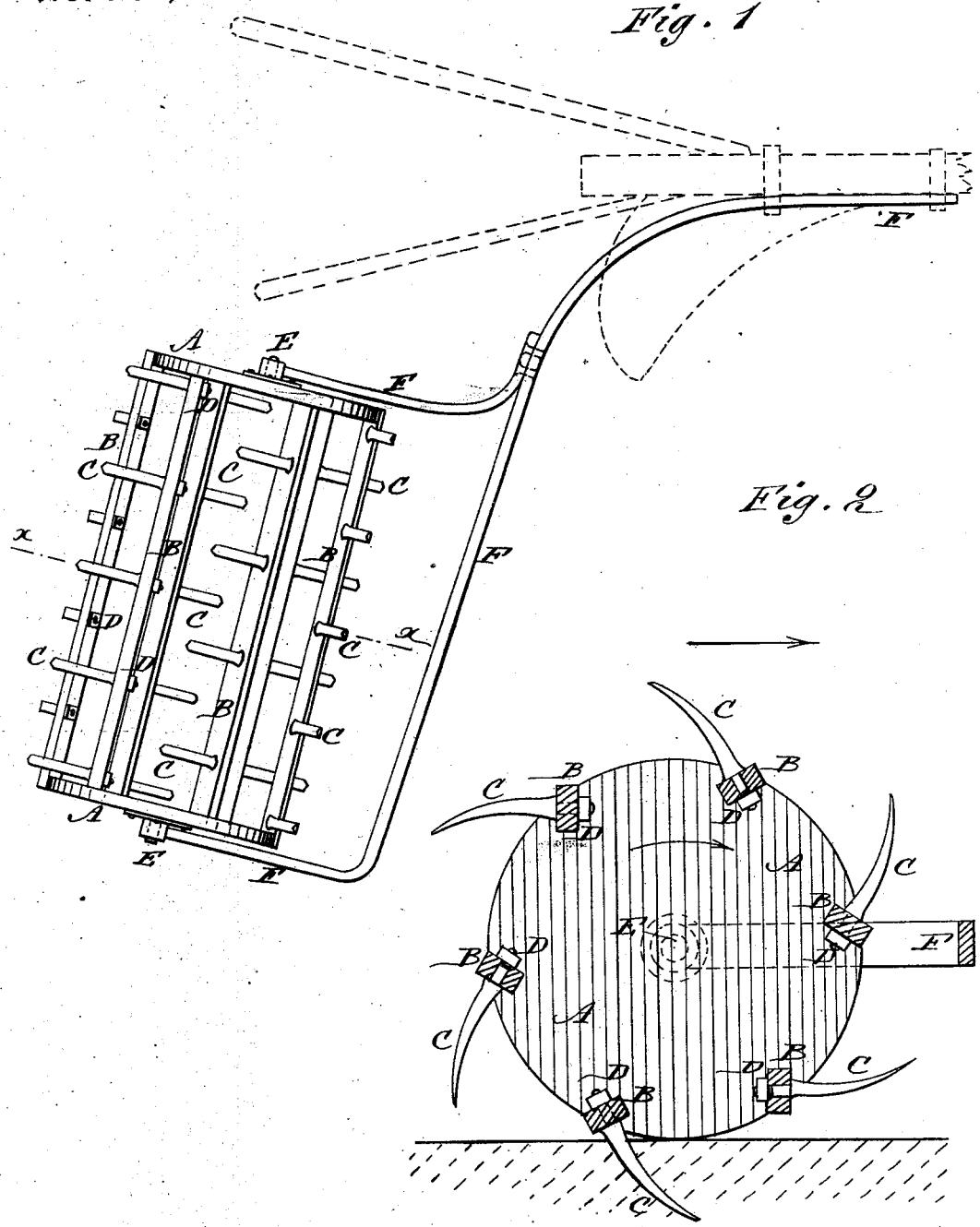

WILLIAM G. KENNEDY, LEONARD Z. PRESTON, FRANKLIN A. MORAND, AND EDGAR H. KENNEDY, OF WARREN, KANSAS.

REVOLVING HARROW ATTACHMENT FOR PLOWS.

SPECIFICATION forming part of Letters Patent No. 237,023, dated January 25, 1881.

Application filed October 27, 1880. (No model.)

*To all whom it may concern:*

Be it known that we, WILLIAM G. KENNEDY, LEONARD Z. PRESTON, FRANKLIN A. MORAND, and EDGAR H. KENNEDY, of Warren, in the county of Cloud and State of Kansas, have invented a new and useful Improvement in Rotary Harrow Attachments for Plows, of which the following is a specification.

Figure 1 is a plan view of the improvement. Fig. 2 is a sectional end elevation taken through the line $x$ $x$, Fig. 1.

Similar letters of reference indicate corresponding parts.

The invention consists in attaching to the beam of a turn-plow a frame in which a skeleton-cylinder is set at a slight incline to the line of draft and provided with teeth rearwardly inclined, as hereinafter described.

A represents two circular heads or disks, in the edges of which, and at suitable distances apart, are formed notches to receive the ends of the bars B. The bars B are secured in place by screws, nails, bands, or other suitable means.

To the bars B are attached teeth C, which teeth may be made flat, or flat upon one side and oval upon the other, and are slightly curved, as shown in Fig. 2. The teeth C are attached to the bars B in such positions that they will incline or slant to the rearward, so that they will strike the ground flat, or nearly so, and will rise from the ground in nearly a vertical direction. The teeth C have tenons formed upon their upper ends, which pass through the bars B, and have screw-threads upon their ends to receive the nuts D, by which they are secured to the bars B.

To the centers of the heads A are attached, or upon them are formed, gudgeons E, which work in bearings in the branched rear end of the beam F, the forward end of which is designed to be secured to a plow-beam by clamps or other suitable means. The beam F is so shaped that the harrow will operate upon the furrow-slice as it is turned, and that its outer end will incline to the rearward, as shown in Fig. 1, so that it will both slide and revolve upon the ground, causing the teeth C to thoroughly tear in pieces and pulverize the furrow-slice, and bring the ground into proper condition to receive the seed.

We are aware that harrows turning in a horizontal plane have been attached to plow-beams, and that it is not new to make harrows with backwardly-inclined teeth, or clod-crushers with a revolving and drag motion.

What we claim is—

The combination, with a turn-plow beam, of a skeleton-cylinder, A B, set in a frame at a slight angle to the plow's line of draft, and provided with rearwardly-inclined teeth, as and for the purpose specified.

WILLIAM GRIMES KENNEDY.
LEONARD ZEPHENIAH PRESTON.
FRANKLIN ALAXANDER MORAND.
EDGAR HERBER KENNEDY.

Witnesses:
HENRY PETER,
W. G. BISH.